United States Patent

[11] 3,609,054

| [72] | Inventor | Bengt Ebbe Harald Nyman<br>Rockford, Ill. |
|---|---|---|
| [21] | Appl. No. | 854,942 |
| [22] | Filed | Sept. 3, 1969 |
| [45] | Patented | Sept. 28, 1971 |
| [73] | Assignee | Atlas Copco Aktiebolag<br>Nacka, Sweden |
| [32] | Priority | Sept. 10, 1968 |
| [33] | | Sweden |
| [31] | | 12128/68 |

[54] POWER OPERATED DRILLING UNIT
9 Claims, 3 Drawing Figs.

[52] U.S. Cl. .................................................. 408/17,
408/130
[51] Int. Cl. .................................................. B23b 39/10,
B23b 47/22

[50] Field of Search ........................................... 77/32.3;
144/107

[56] References Cited
UNITED STATES PATENTS
3,164,040  1/1965  Reynolds ...................... 77/32.3

Primary Examiner—Francis S. Husar
Attorney—Bauer and Goodman

ABSTRACT: A step drilling unit is provided. It has a power means for feeding and retracting a drill. Each step of drilling is timed by a pneumatic timing device which vents a control passage of an air-distributing valve so that the valve shifts from a position for effecting feed movement to a position for effecting retraction.

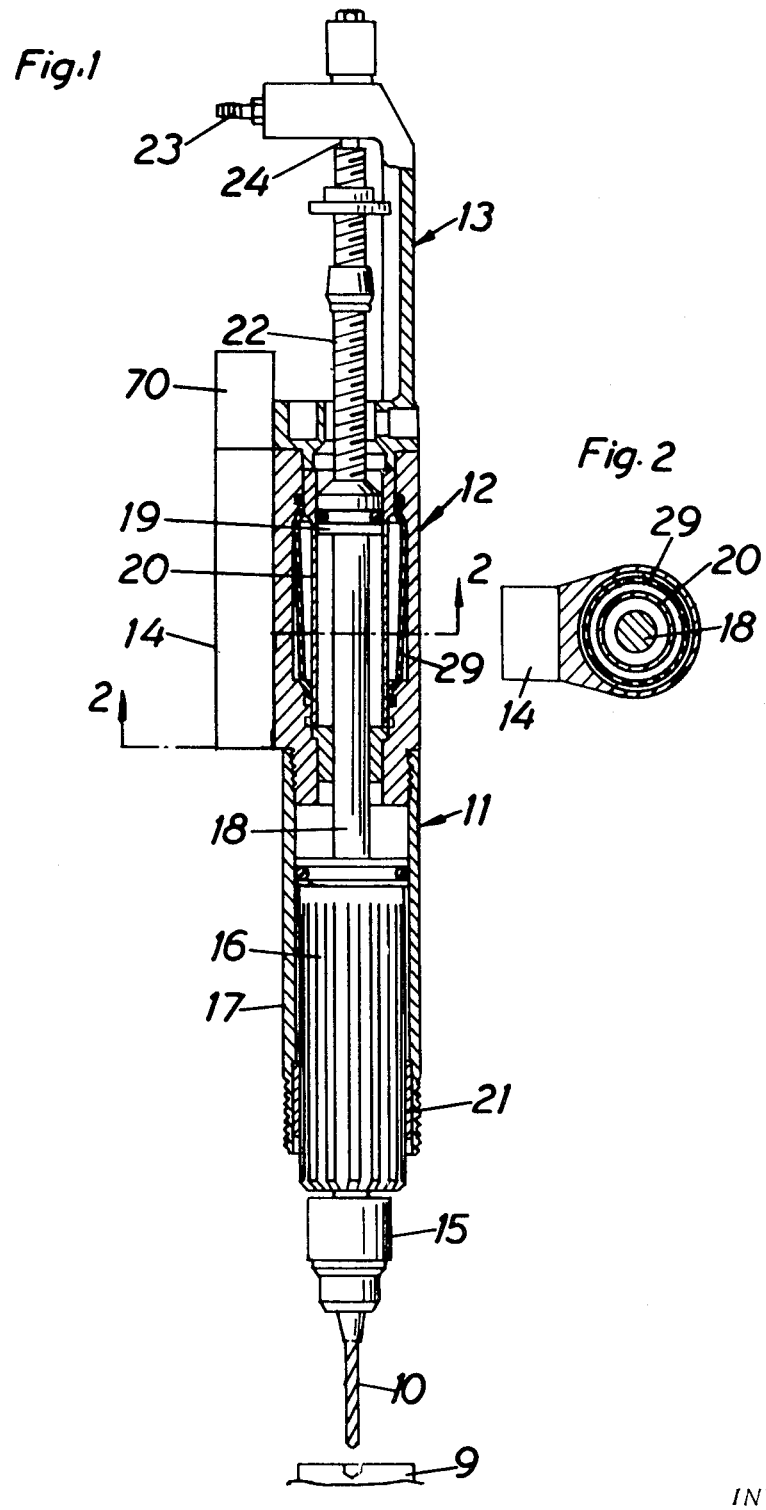

INVENTOR.
BENGT E. H. NYMAN
BY Bauer & Goodwin
ATTORNEYS 3,609,054

POWER OPERATED DRILLING UNIT

This invention relates to power-operated step drilling units of the type provided with power means for feeding and retracting a drill. During operation of such a step drilling unit, a rotating drill is fed toward and into a workpiece for drilling a hole, then withdrawn out of the drill hole in the workpiece, and, thereafter, reinserted in the drill hole for continued drilling. The cycle is repeated until the desired depth of the drill hole is achieved.

Such step drilling (also named peck drilling) is required for drilling holes of a length much larger than the diameter. By each withdrawal of the drill, the hole is cleared of chips. If, instead of this operation, there is a continuous drilling, the chips will clog in the spiral grooves of the drill and drilling will be hazardous.

There are known drilling units, in which the timing of the step drilling operation is carried out electrically, while the axial movement is pneumatic or pneumatic-hydraulic. These systems are complicated and expensive and are easily damaged when subject to rough treatment.

It is an object of the invention to eliminate these disadvantages and create a drilling unit with a completely pneumatic control system for step drilling which can be manufactured as an easily attachable and replaceable unit.

For these and other purposes I provide a power operated drilling unit during operation of which a drill is fed into a workpiece and then withdrawn out of the drill hole in the workpiece and thereafter reinserted in the drill hole for continued drilling, this cycle being repeated until the desired depth of the drill hole is reached, said unit comprising a first part adapted to be mounted in a frame or the like, a second part movably carried by said first part and rotatably carrying a drill, a motor for rotating said drill, means for feeding and retracting said second part, a recipient adapted to be supplied with compressed gas before, in a cycle, the drill starts cutting, a leak passage for venting said recipient, a piston element biased by the gas in the recipient and arranged to initiate retraction when the pressure in the recipient has become reduced by gas leaking through said leak passage, and means for initiating restarting when the tool has become withdrawn from the workpiece.

The above and other objects of the invention are obvious from the following description and the accompanying drawings in which a preferred embodiment of the invention is illustrated by way of example. It is to be understood that various modifications may be made within the scope of the claims.

FIG. 1 is a longitudinal view, partly in section, of a drilling unit according to the invention.

FIG. 2 is a section on line 2—2 in FIG. 1.

Figure 3:
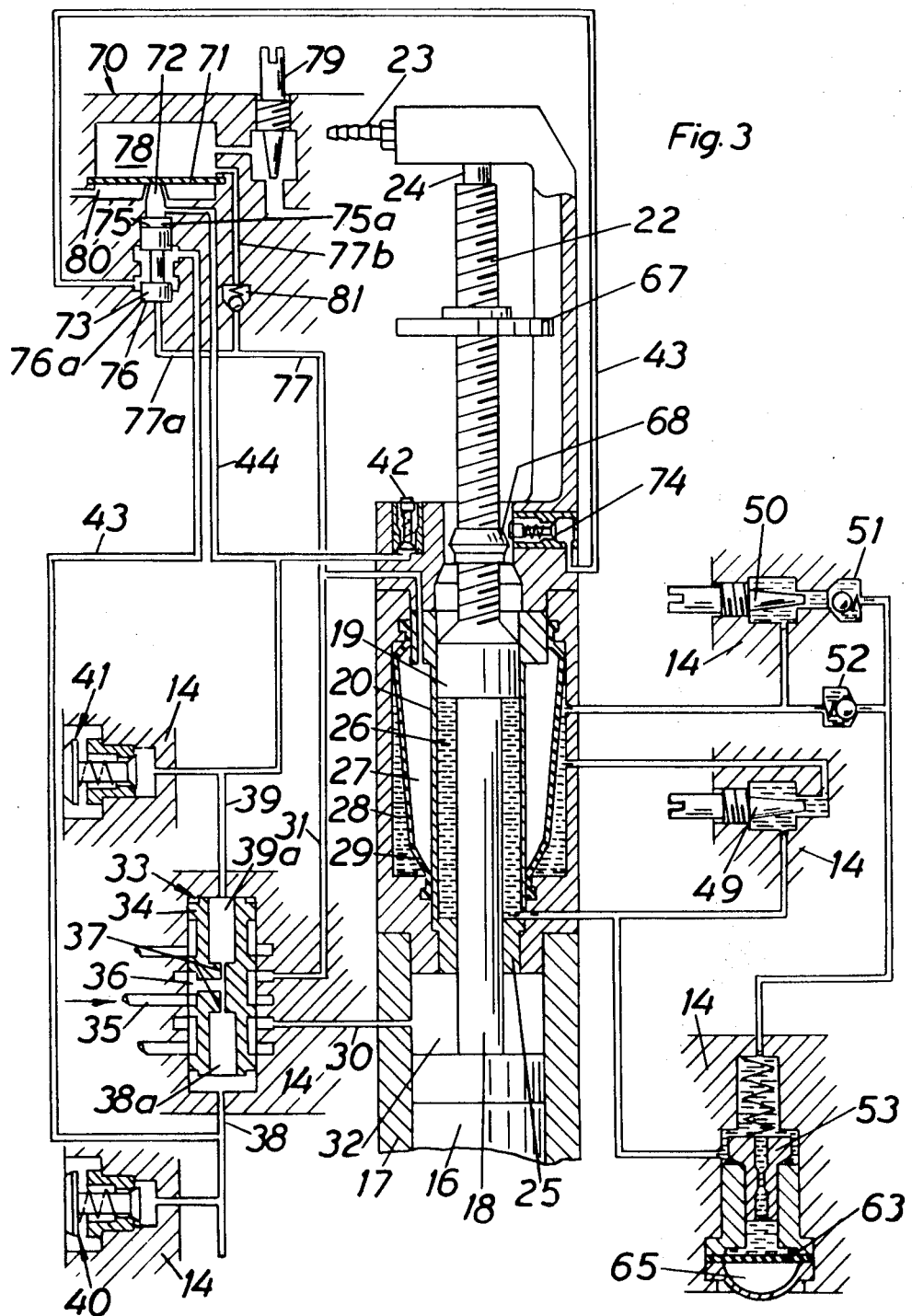

FIG. 3 is a section, on a larger scale, through the back portions of the drilling unit of FIG. 1. It is also a conduit diagram of a control unit for effecting step drilling and of the feeding and retracting means with the pneumatic and hydraulic components, which are parts of a valve block. The valve block and the control unit are shown in FIG. 1.

In the drilling unit illustrated, a stationary part 11 carries an axially movable part 15, 16, 18, 19, 22, which carries and rotates a tool element 10 illustrated as a drill. The stationary part 11 comprises: a forward portion in the form of a cylinder 17 which is to be fixed to a nonillustrated frame which may support a number of units; an intermediate portion 12 with a cylinder 20, a detachable valve block 14 and a control unit 70 for effecting step drilling; and a back head 13. The movable part comprises: a tool holder (chuck) 15; a power unit 16, the rear portion of which constitutes a feed piston which is slidable within the cylinder 17; and a piston rod 18 of the feed piston carrying a return piston 19, which is slidable within the cylinder 20. The piston rod 18 is slidably sealed against a bushing 25, which forms end parts of the cylinders 17 and 20. At the rear of the return piston 19, the piston rod 18 becomes a cam rod 22 on which a cam 68 and a plate 67 are adjustably mounted. Rotation between the movable part 15, 16, 18, 19, 22 and the stationary part 11 is prevented by external straight splines on the power unit 16 mating with internal splines in a sleeve 21 attached to the cylinder 17.

The power unit 16 includes a rotary motor which via a gearing rotates the chuck 15. The rotary motor can be a pneumatically operated sliding vane motor which is supplied with compressed air via a longitudinal channel extending through the cam rod 22 and the piston rod 18. The air is supplied to the cam rod 22 by means of a hose fitting 23, a nonillustrated passage in the back head 13, and a pipe 24 which is fixed to the back head 13 and inserted in and slidably sealed by suitable sealing means to the channel in the cam rod 22. A nonillustrated motor valve at the rear part of the back head 13 is controlled by the cam rod 22 and admits compressed air to the motor as soon as the cam rod 22 leaves its retracted position and shuts off the airflow when this retracted position is again reached. Thus, the motor rotates during an entire cycle of feed motion and return motion.

A cylinder chamber 26 of the cylinder 20, FIG. 3, in front of the piston 19 is filled with a hydraulic fluid, e.g., hydraulic oil. Via a system of channels in the valve block 14 which includes various valves 49–53, the cylinder chamber 26 is connected to an annular hydraulic fluid reservoir 28 which is separated from an annular air chamber 27 by means of a sealed elastic rubber membrane 29. Via channels 30, 31, the air chamber 27, and an air chamber 32 of the cylinder 17 at the rear of the feed piston/power unit 16 may be supplied with compressed air respectively vented through an air-distributing and direction-controlling valve 33 which is in the valve block 14 and has a valving slide shown as a spool 34.

Through a main supply conduit 35 connected to a source of compressed air, live air is supplied to the air distributing valve 33 and through leak passages in the form of a bore 36 and restricted channels 37 in the valving slide 34, air is continuously leaking into two end chambers/control chambers 38a, 39a of the air-distributing valve 33. Control conduits 38, 39 are connected to these chambers. The air-distributing valve 33 is controlled by instantaneous venting of either of the control conduits 38, 39. For this purpose, there are venting valves 40, 41, 42, 74 of the poppet valve type connected to the control conduits 38, 39. The valve 40 is a start valve for manually initiated start. The valve 41 is a stop valve for manually initiated stop. The valve 42 is a limit valve which initiates retraction. The valve 74 is a restart valve for initiating shifting of a retraction into a feed motion. Retraction can be initiated, as well, by means of a membrane (piston element) 71 which controls a mouth 72 of a branch 44 of the control conduit 39. Relatively great friction between the valving slide 34 and the cylinder in which it is reciprocating is obtained by the use of sealing O-rings (nonillustrated). Therefore, the valving slide 34 is retained in the position it takes up when either of the control channels 38, 39 is instantaneously vented.

When the valving slide 34 is in its nonillustrated position for effecting feed motion which is obtained by venting of the control conduit 38, compressed air is supplied from the air-distributing valve 33 to the air chamber 32 via the channel 30, and the air chamber 27 is vented via the channel 31. The feed piston/power unit 16 moves therefore forwards. By this feed motion, the return piston forces hydraulic fluid from the cylinder chamber 26 to the hydraulic fluid reservoir 28 via a passage with a cutoff valve 53 and also via a passage with a restriction valve 49. When the valving slide 34 is in its position for effecting retraction (FIG. 3), obtained by venting of the conduit 38, the air chamber 27 is pressurized and the air chamber 32 is vented. Therefore, the membrane 29 forces hydraulic fluid from the reservoir 28 to the cylinder chamber 26, and, thus, the return piston 19 is forced to retract.

During an approach feed, the cutoff valve 53 is open so as to permit an almost unrestricted flow. As a result the approach feed is rapid. Upon contact of the drill 10 with the workpiece 9, the return piston 19 is suddenly retarded because the drill starts taking up axial load. A sudden reduction in the pressure of the liquid will result. Now, an air chamber 65, separated by an elastic membrane 63, will expand and urge the cutoff valve 53 to close. The flowing fluid must now pass the restriction valve 49, and a slower working feed of a precise and uniform speed is effected.

The control unit 70 for effecting step drilling includes a branch 43 of the control conduit 38. This conduit 43 is connected to the restart valve 74. A shutoff valve in the form of a slide 73, sealed by means of nonillustrated O-rings, is arranged for blocking off the conduit 43. The position of the slide 73 is controlled by the air pressure acting on its two end surfaces 75, 76. The end face 75 separates an end chamber 75a and is influenced by the air which leaks through the valving slide 34 of the air-distributing valve 33 and into the control conduit 39, 44. The end face 76 separates an end chamber 76a and is influenced by the air which, during retraction, flows through a branch conduit 77, 77a of the channel 31. Simultaneously, airflows through a channel 77b provided with an one-way valve 81 into an air recipient 78. The membrane 71 separates the recipient 78 from an air chamber 80. The recipient 78 can be vented only through a channel provided with an adjustable restriction valve 79. Since the mouth 72 is disposed in the air chamber 80, which is vented to the atmosphere, and since the membrane 71 is acted upon by air in the recipient 78 and has an area which is much greater than the area of the mouth 72, a corresponding higher pressure in the mouth than in the recipient is required before the membrane opens the mouth.

The action of the control unit 70 will now be described with reference to FIG. 3. Assume that a feed motion of the movable part 15, 16, 18, 19, 22 of the drilling unit has just begun. The recipient 78 had been under pressure by means of the conduit 77b until the feed motion was initiated. The pressure in the recipient 78 is therefore high, but will now be reduced gradually because of leakage through the adjustable restriction valve 79; the membrane 71 seals against the mouth 72; and the slide 73 is in its open position, i.e., the conduit 43 is open through the valve 73. After a certain time, adjustable with the restriction valve 79, the pressure in the accumulator 78 is so low that the membrane 71 opens the mouth 72 because of the high pressure in the mouth. This vents the control conduit 39, and the valve body 34 moves to its position for retraction, illustrated in FIG. 3. The air chamber 27 is now supplied with compressed air, and the movable part of the drilling unit retracts. Simultaneously, compressed airflows through the conduits 77, 77a, 77b into the air accumulator 78 and into the end chamber 76a as well. The membrane 71 closes the mouth 72 at a very small rise in pressure in the recipient 78 because of its great area. Because of the great volumes of the recipient 78 and the air chamber 27, the pressure acting on the end face 76 of the slide 73 does not rise as fast as the pressure acting on the other end face 75, which is of same area. The pressure acting on the end face 75 rises very fast because of leakage through one of the channels 37 in the valve body 34 of the air-distributing valve 33 out into the control channel system 39, 44, which is of small volume. Therefore, the slide 73 remains in its open position during the retraction.

During the whole retraction, the recipient 78 is pressurized through the conduit 77b. The slide 73 is still in its open position when the cam 68 reaches and opens the restart valve 74 so that the control conduit 38 of the supply control valve 33 is vented. Now, the valving slide 34 of the air distributing valve 33 moves to the nonillustrated position for effecting feed motion; the air chamber 27 is vented through the air-distributing valve 33; the one-way valve 81 in the conduit 77b takes up closed position; and the timing by air leaking from the recipient 78 starts again.

In this way, the sequence of feed motion and retraction is repeated. Every retraction clears the drill hole of chips. By adjusting the position of the plate 67 on the cam rod 22, the position for the initiation of the final retraction can be adjusted to correspond with the desired depth of the drill hole. This position for the initiation of final retraction is the position in which the plate 67 reaches and opens the limit valve 42 so that the control conduit 39 is vented and the air-distributing valve 33 takes up its position for retraction. The rising pressure on the piston face 76 of the slide 73 causes the slide to take up closed position because its piston face 75 will not be influenced by compressed air before the venting valve 42 is closed i.e., not before the retraction has started Because the slide 73 now blocks off the conduit 43, the control conduit 38 will not be vented when the cam 68 opens the venting valve 74. Therefore, the movable part of the drilling unit passes the position for restart, which is defined by the cam 68 and the venting valve 74, and stops in its retracted position. The recipient 78 and the air chamber 27 remains under pressure in this retracted position.

The cutoff valve 53 is open during every retraction, and, during every feed motion, it is open until the drill contacts the bottom of the hole. Therefore, a chip removing sequence, i.e., retraction and approach, is a very fast operation.

The invention is not limited to the described embodiment but may be varied within the scope of the accompanying claims.

I claim:

1. A power-operated drilling unit during operation of which a drill is fed into a workpiece and then withdrawn out of the drill hole in the workpiece and thereafter reinserted in the drill hole for continued drilling, this cycle being repeated until the desired depth of the drill hole is reached, said unit comprising a first part adapted to be mounted in a frame or the like, a second part movably carried by said first part and rotatably carrying a drill, a motor for rotating said drill, means for feeding and retracting said second part, a recipient adapted to be supplied with compressed gas during retraction of said second part, a leak passage for venting said recipient, a piston element biased by the gas in the recipient and arranged to initiate retraction when the pressure in the recipient has become reduced by gas leaking through said leak passage, and means for initiating feeding of said second part when the tool has become withdrawn from the workpiece.

2. A drilling unit according to claim 1 in which: said means for feeding and retracting said second part is operated by the action of compressed air supplied via an air-distributing valve having a valving slide, which is reciprocably movable in a cylinder and has two opposed piston surfaces each bounding a control chamber, each of which control chambers being supplied with compressed air through a leak passage; a first control conduit is connected to a first of said control chambers and adapted to be vented by the action of said piston element when the pressure in the recipient has become reduced so that the valving slide is urged to a position for effecting retraction; a second control conduit is connected between a second of the control chambers and a venting valve for initiating restart which is carried by said first part; and an element is carried by said second part for actuating said venting valve so that the valving slide is urged to a position for effecting feed motion.

3. A drilling unit according to claim 2 in which said piston element is an elastic membrane which constitutes a wall of said recipient and is adapted to be pressed to seal against a mouth of said first control conduit by compressed air supplied to the recipient.

4. A drilling unit according to claim 3 in which a shutoff valve is disposed in the second control conduit and arranged to be urged to closed position by the action of a limit switch which is activated by an element carried by the second part when the final depth of the drill hole is achieved.

5. A drilling unit according to claim 4 in which: said part comprises a power unit for carrying and rotating a chuck for a drill, a feed piston rigidly connected to said power unit, and a return piston coaxial with said feed piston and rigidly connected therewith; said first part comprises a first cylinder in which said feed piston is reciprocable, a second cylinder in which said return piston is reciprocable, an annular space surrounding said second cylinder, an elastic membrane sealingly dividing said annular space into an air chamber and an hydraulic fluid reservoir, a first air-distributing conduit between the air-distributing valve and said first cylinder at the rear of said feed piston, and a second air-distributing conduit between the air-distributing valve and the air chamber; and said shutoff valve comprises a slide reciprocating in a cylinder and having two end faces, a first of which bounds a first controlling end chamber connected to a venting valve which constitutes said limit switch, a second of which bounds a second controlling end chamber connected to said second air-distributing conduit, said shutoff valve being arranged to take up closed position when the air pressure in said second controlling end chamber thereof exceeds the air pressure in said first controlling end chamber thereof, and said second air-distributing conduit being connected to the recipient via conduit which incorporates a one-way valve and being also connected to said second controlling end chamber of the shutoff valve.

6. A drilling unit according to claim 5 in which the venting valve which constitutes the limit switch and said first end chamber of the shutoff valve are connected to the first control conduit of the fluid-distributing valve.

7. A compressed air-operated drilling unit which during operation is fed into a workpiece and then withdrawn out of the drill hole in the workpiece and thereafter reinserted in the drill hole for continued drilling comprising a distributing valve (33) adapted to be connected to a supply of compressed air for controlling feeding and retraction of said unit, said distributing valve (33) being provided with control chambers (38a, 39a), a piston and pressure chamber means (78, 71) adapted to be automatically loaded by compressed air during retraction and operable during feeding as a timing means, an adjustable exhaust throttle (79) for exhausting said pressure chamber means (78, 71) to effect timed switching of the distributing valve (33) to produce retraction, and a check valve (81), said piston and pressure chamber means (78, 71) being connected to the supply of compressed air in series with said distributing valve (33) through said check valve (81).

8. The compressed air operated drilling unit of claim 7 wherein the piston (71) of the piston and pressure chamber means (78, 71) is formed by an elastic membrane providing a wall portion in the pressure chamber (78), the membrane being adapted to close or to open an exhaust orifice (72) adjacent the pressure chamber (78) and connected to one of the control chambers (39a).

9. The compressed air operated drilling unit of claim 8 comprising a shutoff valve (73) formed with opposed valve control chambers (75a, 76a);

a limit switch means (74) located to terminate the retraction of the drilling unit; and an abutment actuated (67) limit switch (42) defining the final depth of the drill hole;

wherein the other control chamber (38a) of the distributing valve (33) is connected to the shutoff valve (73) to inactivate said limit switch (74) terminating the retraction; one of the valve control chambers (75a) of said shutoff valve (73) being connected for alternate exhaustion by the piston and pressure chamber means (78, 71) or by said abutment actuated limit switch (42); the other one (76a) of the opposed valve control chambers being connected to the distributing valve (33) in parallel with the check valve (81).